US008365877B2

(12) United States Patent
Kowatsch

(10) Patent No.: US 8,365,877 B2

(45) Date of Patent: Feb. 5, 2013

(54) ABSEILING DEVICE

(75) Inventor: Ulrich Kowatsch, Leonberg (DE)

(73) Assignee: Suco Robert Scheuffele GmbH & Co. KG, Bletigheim-Bissingen (DE)

(*) Notice: Subject to any disclaimer, the term of this patent is extended or adjusted under 35 U.S.C. 154(b) by 726 days.

(21) Appl. No.: 12/144,856

(22) Filed: Jun. 24, 2008

(65) Prior Publication Data

US 2009/0000879 A1 Jan. 1, 2009

(30) Foreign Application Priority Data

Jun. 29, 2007 (DE) ......................... 10 2007 030 360

(51) Int. Cl.
*B60H 59/14* (2006.01)

(52) U.S. Cl. ...... 188/65.4; 188/65.5; 188/180; 188/184; 188/185; 188/188

(58) Field of Classification Search ................. 188/65.4, 188/65.5, 180, 184, 185, 188
See application file for complete search history.

(56) References Cited

U.S. PATENT DOCUMENTS 209,137 A * 10/1878 Rotschka et al. ............. 182/193
2,933,157 A * 4/1960 Huber .......................... 188/65.1
2,976,955 A * 3/1961 Huber .......................... 188/65.1
4,531,610 A * 7/1985 Fertier et al. ...................... 182/5
4,533,026 A * 8/1985 Bernard ........................ 188/184
4,938,435 A * 7/1990 Varner et al. .................. 244/142
5,127,490 A * 7/1992 Sheu ................................ 182/5
5,360,083 A * 11/1994 Hede ................................ 182/5
2002/0017428 A1 2/2002 Mauthner
2004/0245047 A1* 12/2004 Fischer .......................... 182/70

FOREIGN PATENT DOCUMENTS

| | | |
|---|---|---|
| CH | 8 030 | 8/1894 |
| CN | 85107312 | 4/1987 |
| DE | 10 2006 009 332 | 9/2007 |
| FR | 2 505 309 | 11/1982 |

* cited by examiner

*Primary Examiner* — Bradley King
*Assistant Examiner* — Mahbubur Rashid
(74) *Attorney, Agent, or Firm* — Michael J. Striker

(57) ABSTRACT

An abseiling device for braking a load (16) that is suspended on a rope (14) and may be fastened to the abseiling device (10), with which the rope (14) passes through the abseiling device (10) and is frictionally guided along a section (22), at least one portion of the section (22) being guided by a part (25) of the abseiling device (10) that is movable out of an unloaded starting position relative to a housing (12) of the abseiling device; when a load is suspended, the part (25) generates a frictional force that is a function of the weight of the load (16).

13 Claims, 5 Drawing Sheets

ABSEILING DEVICE

CROSS-REFERENCE TO RELATED APPLICATION

The invention described and claimed hereinbelow is also described in German Patent Application DE 10 2007 030 360.4 filed on Jun. 29, 2007. This German Patent Application, whose subject matter is incorporated here by reference, provides the basis for a claim of priority of invention under 35 U.S.C. 119(*a*)-(*d*).

BACKGROUND OF THE INVENTION

The present invention relates to an abseiling device for braking a load that is guided on a rope and that may be attached to the abseiling device, with which the rope passes through the abseiling device via a section in a friction-guided manner.

A device of this type is known from DE 10 2006 009 332 A1. With the known device, the frictionally-guided section for the rope and a brakable shaft are provided, the rope being pressed against the brakable shaft with a specifiable contact pressure. This abseiling device therefore has the advantage that the shaft brake may be designed small in size, since the shaft brake is supported in its braking operation by a frictionally-guided section. Since it is possible to adjust the contact force with which the rope is pressed against the brakable shaft, the abseiling device may be adjusted for loads having different weights. A bit of experience is required, however, to correctly adjust the contact force to the particular load weight. It cannot be ruled out that misuse will occur, which could result in the load being lowered too rapidly or the abseiling device becoming blocked.

SUMMARY OF THE INVENTION

The object of the present invention is to provide an abseiling device that automatically adapts itself to the weight of the load to be lowered, and that may therefore be used for a large bandwidth of load weights, without manual intervention.

The object is attained according to the present invention in that at least one portion of the frictionally-guided section is guided via a part that is movable out of an unloaded starting position relative to a housing 12 of the abseiling device, which, when a load is suspended, generates a frictional force on the rope that is a function of the weight of the load.

The inventive abseiling device has the advantage that the load weight results in a certain deflection or displacement of the movable part, thereby resulting in a frictional force being automatically produced that acts on the rope and makes it possible to lower the load with a controlled speed. When the loads are heavy, the frictional force that is produced is greater than it is with lighter loads. With the inventive abseiling device, it is therefore possible to lower loads of, e.g., 30 kg to 200 kg, without the need to manually adjust the frictional force.

The movable part may preferably exert a frictional force on the rope by pressing the rope against a fixed surface of the abseiling device. Depending on the magnitude of the displacement of the movable part, the distance between the movable part and the fixed surface in the region of the rope guide may be increased or reduced. It is also possible for the rope to be deflected—in the region of the section that is guided via the movable part—by the fixed surface, and for the frictional force that is produced at the deflection point to be of a magnitude that depends on the load.

In a preferred embodiment, the fixed surface is the surface of a brakable shaft. In this case, the frictional force may be adjusted automatically to the load weight via the movable part, by changing the contact pressure of the rope against the shaft, by changing the gripping surface of the rope, and/or by changing the wrap angle of the rope.

It is particularly advantageous when the brakable shaft is braked using a centrifugal brake. Centrifugal brakes may be designed compact in size and secured to the brakable shaft; they prevent a rope from passing through the abseiling device too rapidly. The brakable shaft may have a small diameter, thereby resulting in high rotational speeds during braking. This makes it possible to use relatively small centrifugal brakes.

The unloaded starting position of the movable part may be a central position, in which no or only minimal frictional force may be exerted on the rope by the movable part. When the movable part is placed in this central position, the rope may be pulled through the abseiling device in a nearly frictionless manner to be wound up, e.g., after one is finished using the abseiling device.

In a preferred embodiment of the present invention, the frictionally-guided section is designed as a channel in the abseiling device, which has a smaller diameter than that of the rope that is guided through the abseiling device, and/or the rope is deflected multiple times away from its weight-guided direction via rollers and/or bolts, and/or the rope is guided through a winding channel, in particular being guided through the abseiling device in a meandering or serpentine manner.

The frictionally-guided section may have a different design, in order to support the brakable shaft. It is important in this context that the rope that is being guided in the device be braked adequately using a sufficient amount of frictional energy, and that the rope not be thermally overloaded in the braking procedure. The rope may therefore be guided through the abseiling device in a curved manner along this section via rigid bolts, supported rollers, constrictions, and/or more or fewer guide elements, it also being possible to provide cooling elements or slits in the device, if necessary.

In a further embodiment of the present invention, the outer surface of the rollers and/or bolts is roughened, and/or includes a material coating, and it has a higher coefficient of friction than does the rope material that was selected.

This has the advantage that the frictionally-guided section may be adjusted for the type of rope material to be used, in order to attain the best possible braking of the rope in the abseiling device.

In a further advantageous embodiment of the abseiling device, the frictionally-guided section may be a three-dimensional section, i.e., it may extend not only in one plane, but also perpendicularly thereto. This has the advantage that the frictional force required for the rope may be applied even when the housing of the abseiling device is very small. The necessary changes in direction of the rope, which generate the frictional force required, may then also be realized in housings that are roughly the size of a human hand.

In a further embodiment of the present invention, the braking device includes a rope reservoir. This has the advantage that the abseiling device may be designed in advance for certain applications, and it may be manufactured such that it is ready to use.

If the abseiling device will be used, e.g., for fire safety purposes on buildings, the rope reservoir may store the length of rope that is required to lower a person or a load safely to the ground from the highest point of a building. In addition, the inventive device may be completely pre-installed, i.e., at one end, the rope is attached to the highest point of a building, e.g., via a hook, with the abseiling device attached to the rope itself, the abseiling device including a load opening via which a load—if it is attached there—may be lowered safely to the ground from a tall height.

Advantageously, the rope may be a plastic rope, a steel rope, or a fibrous composite rope. The fibrous composite rope may be made with or without fibers made of high-strength materials. Other types of ropes made of any types of metallic materials and fibrous composite materials may also be used with the inventive abseiling device, however.

In a further embodiment, the abseiling device may be used in reciprocating operation, i.e., the housing through which a rope—which may be braked in a controlled manner—passes is fixedly attached to a retaining element, and loads may be lowered using both ends of the rope in a reciprocating operation. When a load is lowered via one free end of the rope, this free end of the rope moves away from the housing with the braking devices provided therein (braking means via frictional forces, and the centrifugal brake) in a controlled manner, while the other free end of the rope moves as close as possible to the housing of the abseiling device. Once the abseiling procedure with the one free end of the rope has ended, a new abseiling procedure may be initiated using the other free end of the rope in that the rope passes through the housing with the braking devices in the opposite direction.

If the braking device includes a brakable shaft, a hand wheel may be provided in the housing, via which the braking effect of the shaft may be influenced, e.g., using a centrifugal brake, up to the point of being completely blocked. This has the advantage that the lowering of a load may be halted at any height. When a person is lowered using the inventive abseiling device, the person may stop the abseiling device at any height and then restart the abseiling procedure by blocking or releasing the centrifugal brake using the hand wheel. If the centrifugal brake is blocked, by virtue of the fact that the brake pads press against the corresponding braking surfaces in the housing to such an extent that the rope is unable to move in the housing, the person being lowered by the rope has both hands free to use as necessary. To continue the abseiling procedure, the hand wheel is rotated in the reverse direction in order to release the centrifugal brake.

If the weights (persons, loads) to be lowered by rope are too light for the abseiling device that was selected, or if a person wants to lower himself at a higher rate of speed, the rotational motion of the brakable shaft may be supported via a hand crank. This hand-operated crank may counteract braking forces that result due to friction and/or centrifugal force.

Embodiments are also advantageous with which the desired braking effect is delayed by the abseiling device and sets in as a function of weight, i.e., the load to be lowered by rope. This has the advantage that jerky braking motions that take place when load peaks occur abruptly, due, e.g., to accelerating weights (persons who jump out of the window of a building with the inventive abseiling device), are avoided. It may be provided that, e.g., loads of more than 200 kg on a rope may be initially braked only barely, with the braking force increasing with a time delay until the desired abseiling speed sets in a self-regulating manner via the centrifugal brake.

BRIEF DESCRIPTION OF THE DRAWINGS

The inventive abseiling device is described as an example with reference to an exemplary embodiment in the figures below.

DESCRIPTION OF THE PREFERRED EMBODIMENTS

Figure 1:
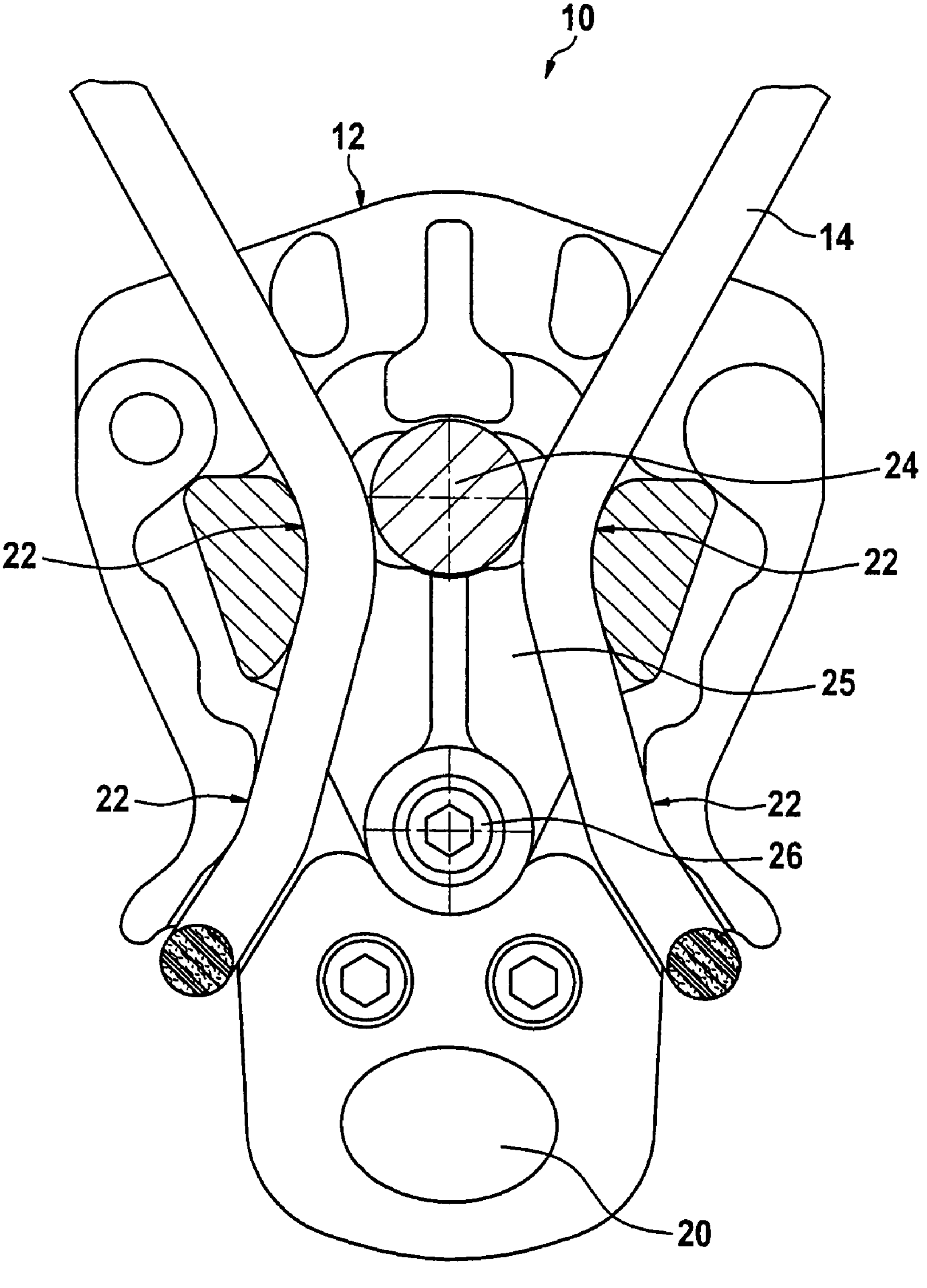
FIG. 1 shows a cross section of an inventive abseiling device in a highly schematicized illustration with a swivelable part in the unloaded central position.

FIG. 1 shows abseiling device 10 with a housing 12, in which a rope 14 is guided through abseiling device 10.

Abseiling device 10 includes an opening 20, at which a load or person's seat harness may be attached, in order to lower the load or person's seat harness from one point to a lower point using abseiling device 10. Opening 20 may also be used to fasten device 10 when it is used for a reciprocating operation (see FIG. 2). Abseiling device 10 includes a frictionally-guided section 22, which is located directly next to a brakable shaft 24, which is braked using a centrifugal brake.

A portion of frictionally-guided section 22 moves over a movable part 25, which is swivelable in this case, and which is supported on housing 22 such that it may rotate around an axle 26. In the position shown in FIG. 1, swivelable part 25 is located in its unloaded starting position, which is a central position in this case, out of which it may be swiveled in both directions. Swivelable part 25 includes two jaws 28, which form a portion of frictionally-guided section 22 between themselves and brakable shaft 24, which is fixed in position on housing 12. In the central position of swivelable part 25 shown in FIG. 1, the frictional force exerted on rope 14 in this portion of section 22 is minimal. Rope 14 may be pulled through housing 12 easily by hand.

A further portion of section 22 is located below the plane of the drawing, i.e., it extends on the back side of housing 12. Due to this three-dimensional guidance of section 22, housing 12 may be designed with very small dimensions.

Figure 2:
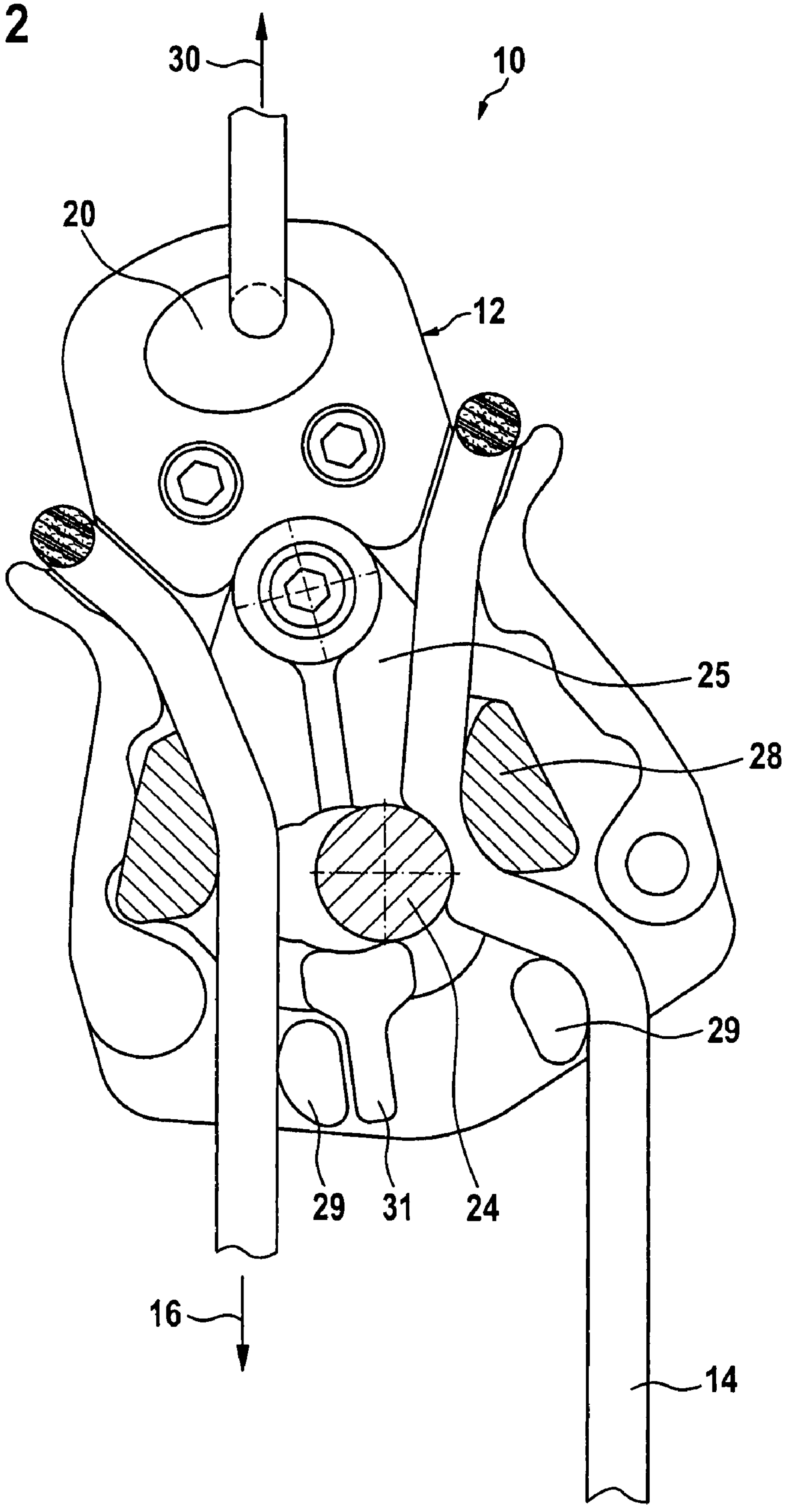
FIG. 2 shows a cross section of the abseiling device in FIG. 1, with a load attached, in a reciprocating operation.

FIG. 2 shows abseiling device 10 when used in a reciprocating operation. Abseiling device 10 may also be used in a reciprocating operation due to the symmetrical design of housing 12, swivelable part 25, and section 22 for the rope. To this end, housing 12 is attached, via opening 20, at a point 30 from which a rope is to be lowered. Loads 16 to be lowered by rope are attached to either end of the rope in an alternating manner. In the example shown, loads 16 are attached to the left end of the rope. Due to load 16, housing 12 and swivelable part 25 now swivel such that load 16 hangs approximately underneath attachment point 30. A load-dependent force is therefore exerted on jaw 28, which presses rope 14 against shaft 24. The weight of load 16 therefore determines the amount of contact force that presses rope 14 against shaft 24. Rope 14 is braked with the equivalent amount of force as it passes through housing 12. The swivel motion of part 25 is limited by stops 29 on housing 12. A projection 31 of swivelable part 25 extends next to stops 29, and may be used simultaneously to manually influence the deflection angle of swivelable part 25.

Figure 3:
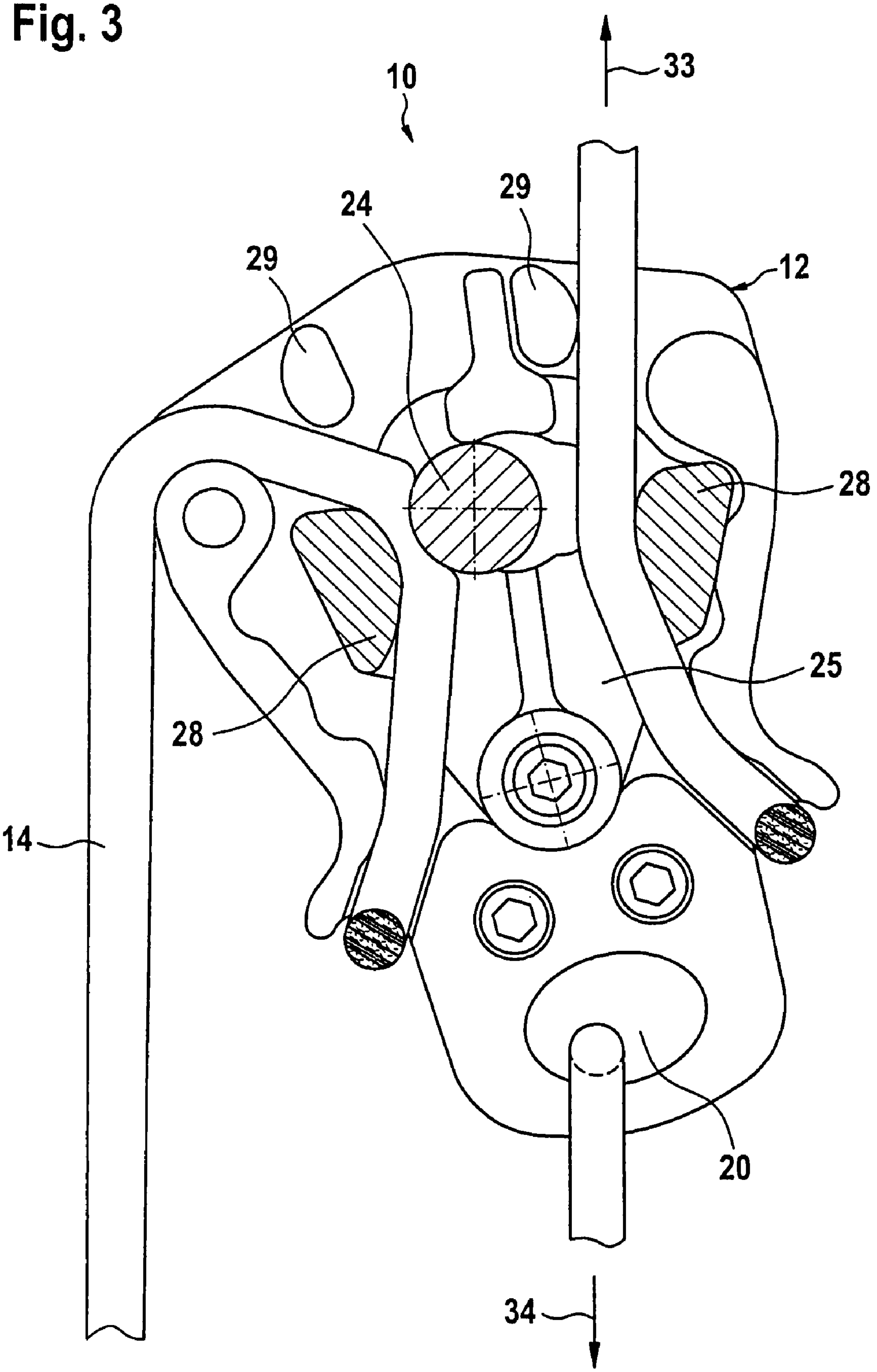
FIG. 3 shows a further embodiment of an inventive abseiling device, also as a cross section, with a load attached, and with the rope being guided out of a rope reservoir.

In contrast to FIG. 2, in the exemplary application of abseiling device 10 shown in FIG. 3, rope 14 is guided from the top out of a not-shown rope reservoir and into abseiling device 10. One end of rope 14—indicated by arrow 33 in this case—is attached at the point from which the load is to be lowered by rope. This point may be, e.g., a part of a building, a window frame, or the like. The load—which is indicated by arrow 34—is now attached in opening 20. Due to attached load 34, housing 12 and movable part 25 begin to swivel again, with the result that rope 14 is deflected via jaws 28 and is pressed via jaw 28 against shaft 24 with a contact force that depends on the weight of load 34. In this state as well, rope 14 therefore experiences a frictional force that depends on the load weight.

Abseiling device 10 may be closed using a not-shown cover, it being necessary for the cover to be supported on housing 12 in a swivelable manner, so that it may be easily opened in order to insert rope 14. To close the cover, it may be provided with an opening, which may overlap opening 20 in housing 12. A spring clip, e.g., may be guided through both openings, which closes the cover and may be used simultaneously to accommodate a load.

Figure 4A:
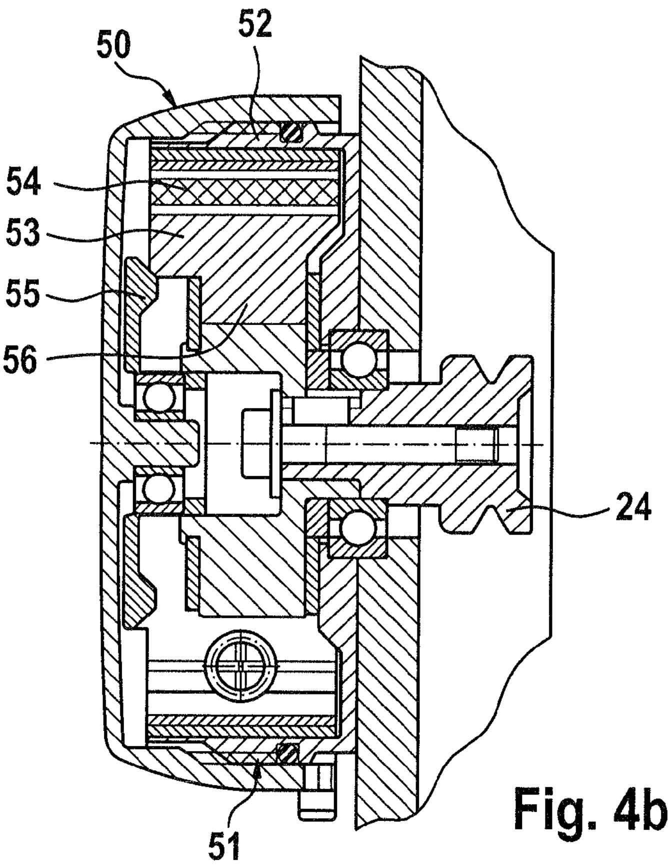
FIGS. 4*a* and 4*b* show a partial cross section through the brakable shaft of the abseiling device in FIG. 1 with a centrifugal brake and a hand wheel.
Figure 4B:
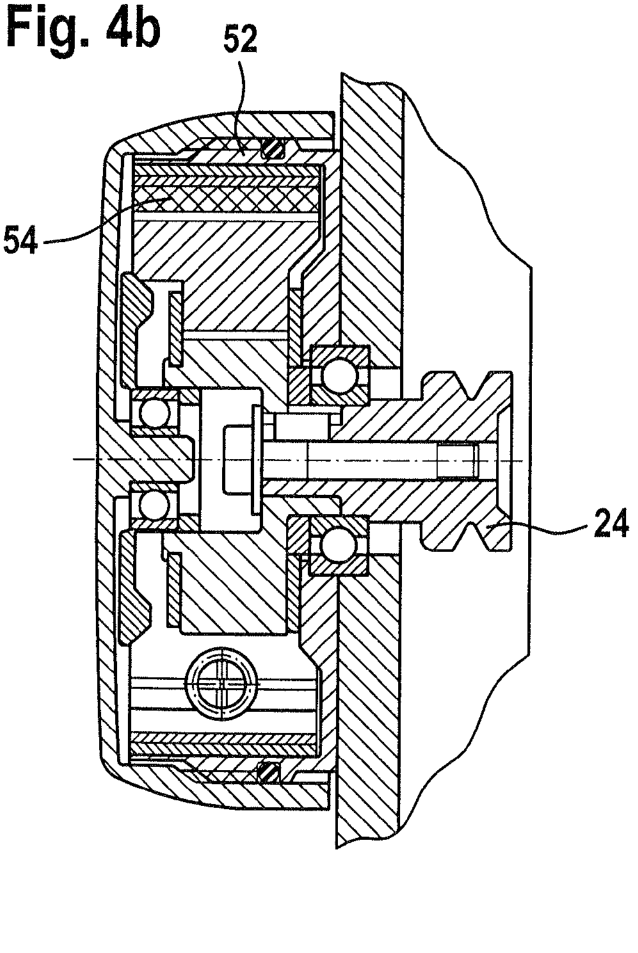

A sectional view through shaft 24, on which a centrifugal brake 51 is located, is shown in FIGS. 4*a*, 4*b*. Centrifugal brake 51 includes at least one centrifugal weight 53, which is provided with a frictional coating 54 on its outer side. In the opened position of brake 51 shown in FIG. 4*a*, there is an air gap between frictional coating 54 and a brake drum, i.e, shaft 24 may rotate in an unbraked manner. When a certain rotational speed is exceeded, the centrifugal weight is carried outwardly and comes to bear with its frictional coating 54 against brake drum 52, thereby braking shaft 24 (FIG. 4*b*).

The brake may also be actuated using hand wheel 50, however, which is screwed onto brake drum 52 from the outside and may be screwed further inward toward shaft 24. If this action is carried out by the user of the abseiling device, e.g., to reduce the lowering speed that sets in automatically due to the centrifugal brake, or to be able to stop during the descent, a conical contact-pressure disk located on the inside of hand wheel 50 presses centrifugal weight 53 outwardly against drum 52, thereby initiating a braking procedure independently of the rotational speed of shaft 24. FIG. 4*b* shows hand wheel 50 in the screwed-in state, in which it halts shaft 24 via brake 51.

Figure 5:
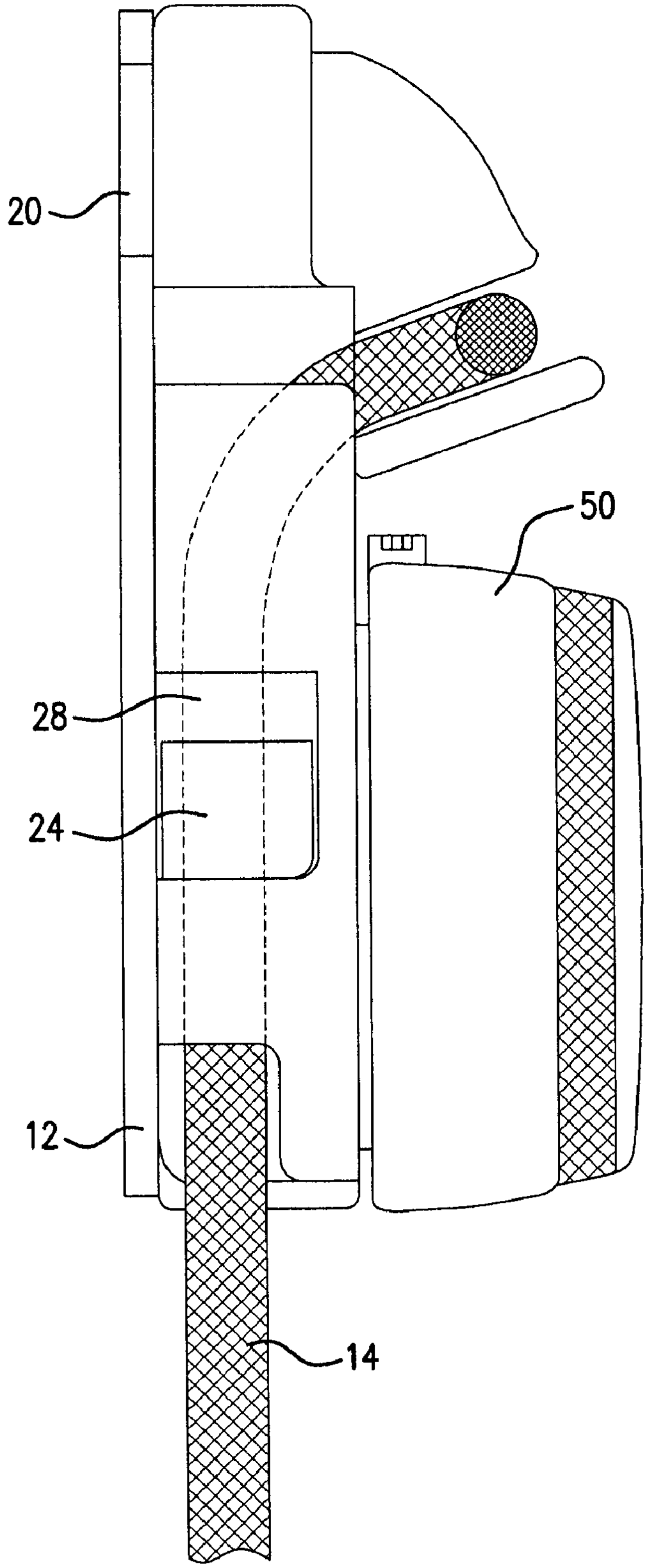
FIG. 5 shows the braking device with a rope reservoir.

FIG. 5 shows the abseiling device 10 of FIG. 3. As noted above, the braking device may include a rope reservoir, shown here in a three-dimensional representation. The rope 14 is guided from the top out of the rope reservoir and into the abseiling device 10.

What is claimed is:

1. An abseiling device for braking a load (16, 34) that is suspended on a rope (14) and is fastenable to the abseiling device (10), in which the rope (14) passes through the abseiling device (10) and is frictionally guided along a section (22), wherein at least one portion of the section (22) is guided by a part (25) that is movable out of an unloaded starting position relative to a housing (12) of the abseiling device (10), and—when a load is suspended—generates a frictional force that depends on a weight of the load (16, 34) so that the load (16, 34) is lowerable with a controlled speed dependent on the weight of the load (16, 34), wherein the movable part (25) exerts a frictional force on the rope (14) by pressing the rope (14) against a relatively stable surface, and wherein said movable part (25) is swivelable from a central position in both directions and thereby exerts a load-dependent force on the rope (14) which presses the rope (14) against a brakable shaft (24) when swiveled in each of said both directions, wherein the relatively stable surface is a surface of the brakable shaft (24), wherein a centrifugal brake (51) is provided in the abseiling device and is located on the brakable shaft (24), and wherein the centrifugal brake (51) includes a brake drum (52) secured to the housing (12), centrifugal weight (53) connected with the brakable shaft (24) so as to rotate with the brakable shaft (24) and to move outward to bear on the brake drum (52) when a rotational speed threshold is exceeded, and a hand wheel (50) connectable with the centrifugal weight (53) to initiate braking independently of the rotational speed threshold.

2. The abseiling device as recited in claim 1, wherein the unloaded starting position of the movable part (25) is a central position, in which no or only minimal frictional force is exertable on the rope (14) by the movable part (25).

3. The abseiling device as recited in claim 1, wherein the frictionally guided section (22) is designed as a channel in the abseiling device (10), which has a smaller diameter than that of the rope (14) guided through the abseiling device.

4. The abseiling device as recited in claim 3, wherein the rope is guided repeatedly over elements selected from the group consisting of rollers and bolts and an outer surface of the elements is roughened and has a higher coefficient of friction than does a rope material of the rope.

5. The abseiling device as recited in claim 1, wherein the friction-guided section (22) is a three-dimensional section.

6. The abseiling device as recited in claim 1, wherein the abseiling device (10) includes a rope reservoir.

7. The abseiling device as recited in claim 1, wherein the rope (14) is selected from the group consisting of a plastic rope, a steel rope, a fibrous composite rope with or without carbon fibers, and a rope (14) that includes another type of metal or fibrous composite material.

8. The abseiling device as recited in claim 1, wherein the abseiling device (10) is useable in a reciprocating operation.

9. The abseiling device as recited in claim 1, wherein a hand crank is provided on the brakable shaft (24), via which the brakable shaft (24) is drivable.

10. The abseiling device as recited in claim 1, wherein the brakable shaft (24) builds up a desired braking force over an interval of time, depending on the weight of the load.

11. The abseiling device as recited in claim 1, wherein the rope is deflected multiple times away from a weight-guided direction thereof via elements selected from the group consisting of rollers and bolts.

12. The abseiling device as recited in claim 1, wherein the rope (14) is guided through a winding channel in a meandering or serpentine manner.

13. The abseiling device as recited in claim 11, wherein said elements have an outer surface that has a higher coefficient of friction than that of a material of said rope deflected multiple times from said weight-guided direction.

* * * * *